Figure 1:
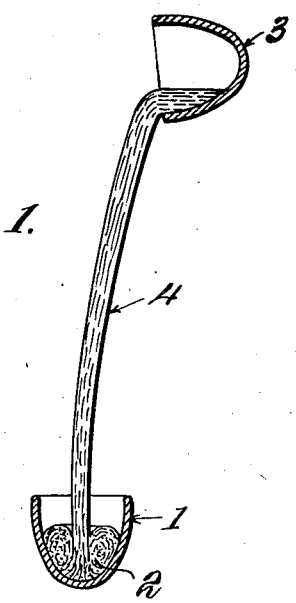
Figure 2:
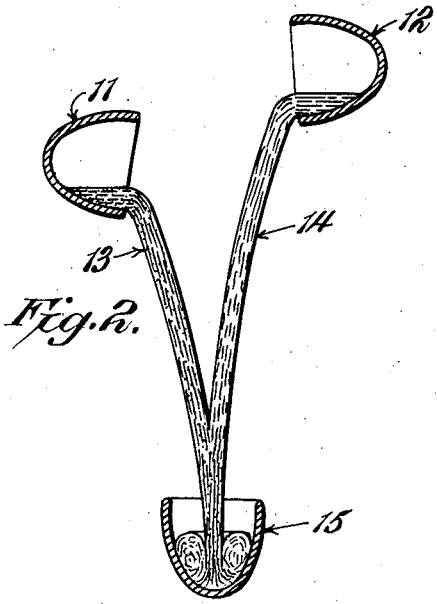

Oct. 1, 1935.　　　　R. PERRIN　　　2,015,693

PURIFYING COPPER

Filed Oct. 30, 1933

Inventor,
Rene Perrin,
By Maurod Lewis,
Attorneys.

Patented Oct. 1, 1935

2,015,693

UNITED STATES PATENT OFFICE 2,015,693

PURIFYING COPPER

René Perrin, Paris, France, assignor to Societe d'Electrochimie d'Electro-metallurgie et des Acieries Electriques d'Ugine, Paris, France Application October 30, 1933, Serial No. 695,910
In Italy June 6, 1932

22 Claims. (Cl. 75—62)

The present invention relates to the purifying of copper, and more especially to the purifying of copper by suitable slags.

By the expression "purifying copper" I intend to include the removal of various impurities, such as the removal of oxygen from refined copper and the removal from crude copper of metals or metalloids occurring as impurities therein, such as sulphur, phosphorus, iron, manganese, nickel, cobalt, zinc, lead, tin, antimony, arsenic, bismuth, etc. The removal of metals and metalloid impurities may be specifically designated as the refining of the crude copper.

The refining operation generally involves the oxidizing out of the various metal and metalloid impurities, leaving the copper in an oxidized condition. The copper is then further purified by a deoxidizing process, such purification being, for convenience, specifically designated as deoxidation.

Heretofore the oxidizing operations for the refining of crude copper have generally been carried out in large furnaces, requiring lengthy and expensive operations with the application of external heat. Furthermore, it has been difficult to obtain an efficient elimination of the various metal and metalloid impurities because such elimination is dependent in each case on the nature of the slags used for this purpose in the refining furnaces. For instance, iron and lead are more easily removed by acid slags, but phosphorus and arsenic are more easily removed by basic slags. In the usual furnace processes it has not been practicable to select readily the kind of slag to be used, for the choice is limited by the nature of the linings of the furnaces, which linings are generally silicious, although sometimes basic linings are employed. As contrasted with this my process is quick, inexpensive and not limited in the choice of slag.

The usual deoxidation processes have likewise been subject to serious limitations. The deoxidation of copper is usually effected with the aid of wood charcoal or anthracite coal spread over the surface of the bath. This operation is accompanied by the stirring of the bath with wooden poles, which operation is termed "poling". The carbon reduces the $Cu_2O$, but the operation is unavoidably long particularly because the carbon is not soluble in the copper. The elimination of the oxygen is always incomplete. In my process the deoxidation is carried out very quickly and inexpensively, and with practically complete elimination of the oxygen. My deoxidizing treatment is such as simultaneously to remove residual metal and metalloid impurities.

In accordance with my process, the molten copper to be purified is quickly and thoroughly intermixed with a fluid molten slag of such a character as to remove the impurities which it is desired to remove, such, for example, as the metal and metalloid impurities in the refining of copper, or copper oxide in the deoxidizing of copper.

The mixing is carried out in such a way that the slag is thoroughly and quickly intermixed with the molten copper in a finely divided or dispersed condition. This is preferably accomplished by violent impact of the molten copper against the slag, whereby not only is the slag broken up into small particles and dispersed into the metal, but the mass of copper and dispersed slag is also given a violent churning or turbulence, insuring the rapid and thorough distribution of the finely dispersed slag throughout the copper. This is preferably accomplished, as hereinafter more particularly described, by causing a rapidly moving or falling body or stream of molten copper to violently impinge against and into a very fluid slag.

The slag employed for purifying the copper may be of any suitable character, best adapted from the chemical viewpoint to remove the desired impurities from the copper. Since the operation can be carried out very quickly, there is no limitation imposed upon the choice of the slag due to the composition of the lining of the vessel in which the reaction is carried out. In the refining of the crude copper, the slag usually contains copper oxide which oxidizes the metal and metalloid impurities in the molten copper, together with either acid or basic oxide radicals which combine with the oxidized metals or metalloids and fix them in the slag. In the case of the deoxidizing, the slag composition is such as to give it the highest possible capacity for extracting the copper oxide from the molten copper. In each case a slag is employed such that there is a state of substantial dis-equilibrium between the impurities in the copper and the slag. The intermixing of the molten slag and molten copper should be accomplished with great violence and rapidity, such as to bring about quickly an intimate contact of very large surface area, due to the breaking-up of the slag into fine particles, between the slag and metal, which in turn causes the concentrations of impurities in the metal and in the slag rapidly to approach a state of equilibrium, resulting in a quick transfer of the impurities from the metal into the slag.

The effect of the impact of the metal against the slag may be aptly described as a turbulent emulsification of the fluid slag and molten metal. Not only is there a tremendously large surface area created between the slag and metal which permits quick transfer of the impurities across the interfaces between the metal and slag particles, making the reaction very rapid, but, since the slag and metal are in a condition of violent turbulence or churning, the slag is thoroughly disseminated and hence caused to act immediately upon the metal, as contrasted, for example, with the usual furnace operation in which the purifying slag remains as a layer upon the top of the metal bath, so that the purifying action of the slag can be exerted only over the relatively small interfacial area between the slag and metal layers, and in which the equilibriums of oxide concentrations within the bodies of the metal and slag layers must take place slowly by diffusion.

As the operation is extremely short, the slag has no time appreciably to attack the walls of the receptacle in which the intermixing is effected, so that the most suitable slag may be selected irrespective of the lining employed for the receptacle. Also, it is possible, if desired, to employ successively, for treating the same bath of copper, several different slags in order to obtain better elimination of impurities. Thus, by causing an acid slag and then a basic slag to act successively in either sequence, the first slag being removed before the second is applied, iron, manganese, nickel, cobalt, zinc and lead may be eliminated by the action of the acid slag, and sulphur, phosphorus, tin, antimony and arsenic by the action of the basic slag. Furthermore, the refining operation of the crude copper may be followed by the deoxidizing operation.

The operations are carried out with such rapidity that no external heating is required. The process therefore makes possible the quick, economical and substantially complete elimination of the several impurities to be removed.

The total time required for such thorough and intimate emulsification or dispersion of the slag into the copper is but a short interval; for example, in the neighborhood of about 30 seconds for pouring 3000 kilograms of copper, into a ladle containing the slag, although somewhat longer time may be needed for larger quantities. As soon as the turbulence or churning about of the slag and metal in the container ceases, the slag and metal, which are both in a fluid condition, separate by gravity, leaving the metal substantially free from slag and in a condition to be immediately poured.

In the drawing,—

Figures 1, 2, 3 and 4 are diagrammatic views showing examples of procedures by which such violent intermixing and thorough dispersion of the slag into the metal may be accomplished.

Referring to Figure 1 of the drawing, reference numeral 1 indicates a container, illustrated as a ladle, in which is placed a fluid molten slag capable of extracting the desired impurities from the copper and in which intimate mixing of the slag and copper occurs. This body of slag is indicated at 2. The slag is heated to a highly fluid condition, being preferably heated to the temperature of the molten copper or somewhat above. As an illustrative example, 300 kilograms of slag may be employed for about 3000 kilograms of copper. After the fluid molten slag is put into the ladle 1, a charge of molten copper is poured rapidly into the ladle 1 from a container holding the copper, illustrated as a ladle 3. The ladle 3 is positioned far enough above the ladle 1 so that the stream of copper 4 strikes against the slag with considerable violence. As an illustrative example, a charge of 3000 kilograms of copper is poured from a height of about 12 feet in about ½ minute. This rate of pouring furnishes a fairly thick stream of molten copper, which falls with considerable force against and into the slag in the lowermost ladle 1. The kinetic energy of the falling stream of copper causes a breaking-up and intimate admixture of copper and slag as the copper impinges against the slag. As the stream of copper hits the slag, not only is there an intimate intermixing, which is believed to be in the nature of an emulsification or fine dispersion of the slag into the copper, but there is also a violent churning or turbulence of the contents of the ladle, resulting in an immediate, intimate and thorough distribution of the dispersed slag into the copper.

This turbulent condition rather quickly subsides due to the frictional dissipation within the mass of the energy of turbulence, whereupon there occurs a rapid and thorough gravity separation of the copper from the slag, resulting in a bath of metal in the bottom of the ladle which is free from the slag and in a condition to be immediately tapped from the ladle. The very fluid condition of the slag not only permits its dispersion or emulsification with the metal in separated finely divided particles, but allows a thorough and rapid gravity separation of the slag and metal. It is to be understood that the example of pouring 3000 kilograms of copper from a height of about 12 feet in about 30 seconds is illustrative as typical, and that the quantity of metal, the height, and rate of pouring, may be varied. In every case, however, the molten copper should be poured from a sufficient height so that there is a violent impact of the copper into the slag sufficient to cause violent, quick and intimate intermixing of slag and copper.

While in intermixing by the pouring operation I prefer to pour the molten copper into a container previously charged with the molten slag, as shown in Figure 1, the intermixing by pouring may be otherwise accomplished. For example, in Figure 2 there are illustrated two ladles 11 and 12 for holding slag and copper, respectively, and from which a stream of slag and a stream of copper are poured simultaneously into a receiving and mixing ladle 15. The ladle containing the copper should, of course, be elevated sufficiently above the receiving ladle so that the stream of copper will strike into the receiving ladle with sufficient impact to cause the violent, quick and intimate intermixing of the copper and slag.

Figure 3:

In Figure 3 there is illustrated another example in which a container, such as a ladle 2, is initially charged with a bath of copper having a supernatant layer of fluid molten slag. A pouring ladle 21 is elevated above a receiving ladle 22 and the contents poured into the receiving ladle. The charge should be poured from a sufficient height so that there is a violent intermixing and dispersion of slag and copper due to the arrested kinetic energy of the falling charge. If desired, an arrangement of two ladles, such as shown in Figure 3, may be employed for pouring the charge back and forth a number of times to secure repeated intermixing of the slag and copper. For example, the ladles 21 and 22 may be mounted on suitable elevating mechanisms whereby one ladle may be elevated, say, a distance of 10 to 20 feet above the other ladle and the charge poured, and then the emptied pouring ladle lowered and the full receiving ladle raised and the charge re-poured into the first ladle.

While for simplicity of illustration I have shown ladles as the containers for pouring and receiving the slag and copper, other suitable containers may be employed. For example, in Figure 1 the copper may be poured or tapped directly from a melting furnace into a ladle or other container placed a suitable distance below it. Also, instead of employing the ladle 1 as a mixing vessel, a previously heated open top furnace may be used. Similarly, in Figures 2 and 3 furnaces or other suitable containers may be employed instead of the ladles illustrated.

Figure 4:
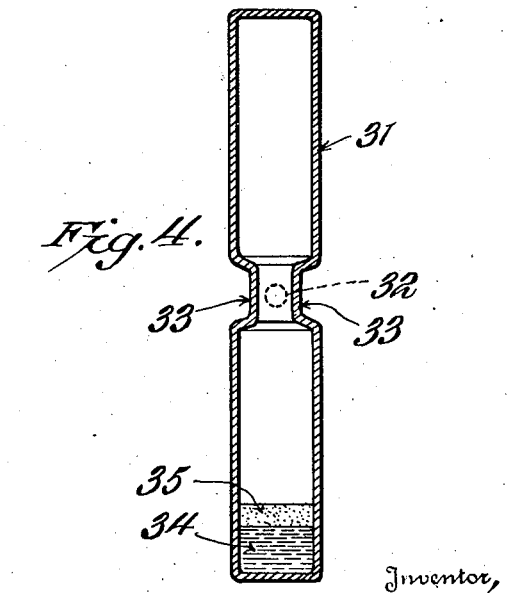

In Figure 4 there is diagrammatically illustrated an arragement of a single vessel by which a violent intermixing of slag and copper may be advantageously accomplished. As illustrated in Figure 4, a relatively long closed container 31, preferably having the general shape illustrated, is trunnioned to be turned about an axis 32. It will be understood, of course, that the drawing is diagrammatic, and that the container will be provided with suitable lining, preferably with heat insulation. The container 31 is preferably provided with restricting portions which serve somewhat as dams to control the discharge of metal and slag from the top to the bottom of the container as the container is inverted. A charge of molten copper 34 and molten slag 35 is put into the container 31. The container is then quickly inverted and its movement quickly stopped in the vertical inverted position. As the container is being swung into its inverted position, the dam 33 tends to hold back the metal and tends to allow the slag to fall first into the then lower part of the container, to be followed by metal which plunges into the slag. Also, the inertia of the metal will tend to retain the metal in the then upper part of the inverted container from which it falls by gravity into the then bottom part of the container where there is a violent impact of copper and slag to cause a thorough intermixing of the two. As an illustrative example, the container 31 may be 10 to 20 feet in length and may be given several rapid inversions per minute.

While I have illustrated and described specific forms of apparatus for carrying out my process, it is to be understood that the invention is not limited thereto, as the thorough intermixing may be otherwise accomplished. However, in all cases there must be a quick and intimate dissemination or dispersion of the slag in a finely divided condition in the copper, of the character obtainable by causing such violent impact that the bodies of slag and copper are broken up and mutually and thoroughly disseminated one into the other.

As above noted, in order to secure effective intermixing or dispersion of the slag and copper, the slag should be in a very fluid condition, and it is also essential that the slag be very fluid in order to permit the gravity separation of the metal from the slag after the purifying operation.

Composition of the slags

For refining crude copper containing metal and metalloid impurities, particularly sulphur, phosphorus, iron, manganese, nickel, cobalt, zinc, lead, tin, antimony, arsenic and bismuth, the slag should be an oxidizing slag to oxidize such impurities. The slag is preferably of such a composition that the metal and metalloid impurities contained in the copper decompose certain of its constituents, thus setting free metallic copper which passes into the metal bath. The oxidized metal and metalloid impurities form compounds insoluble in the molten copper or more soluble in the molten slag than in the molten copper. For this purpose the refining slag contains a copper compound, generally an oxide, a silicate or carbonate, or any suitable salt such as a chloride, or a mixture of these compounds.

The temperatures employed in copper refining are usually about 1200° C., which is considerably lower than those employed in refining steel. Therefore, the slag is preferably chosen which will become fluid at the temperatures of copper refining, although if desired a higher melting point slag may be employed and superheated above these temperatures. The slag is preferably made up of such constituents as to impart to it a suitable fluidity at temperatures of copper refining.

The following are illustrative examples of slag compositions which may be employed:

Example No. 1

| | Per cent |
|---|---|
| $SiO_2$ | 40 |
| $TiO_2$ | 20 |
| $Cu_2O$ | 20 |
| $MnO$ | 15 |
| $Na_2O$ | 5 |

This is a rather low melting point slag.

Example No. 2

A slag of somewhat higher melting point may be made of the following composition:

| | Per cent |
|---|---|
| $SiO_2$ | 55 |
| $CaO$ | 15 |
| $Al_2O_3$ | 10 |
| $Cu_2O$ | 20 |

Example No. 3

| | Per cent |
|---|---|
| $Na_2O$ | 25 |
| $CaO$ | 45 |
| $MnO$ | 15 |
| $Cu_2O$ | 15 |

This is a rather low melting point slag.

Example No. 4

A somewhat higher melting point slag may be composed as follows:

| | Per cent |
|---|---|
| $CaO$ | 60 |
| $MnO$ | 25 |
| $Cu_2O$ | 15 |

The first two examples contain considerable amounts of oxide radicals, such as $SiO_2$ and $TiO_2$, which are acid toward iron and lead oxides. Slags of this character are advantageously employed for removing the impurities which form basic oxides.

The slag of Examples 3 and 4 contain relatively large amounts of basic oxides, such as calcium oxide and soda. These slags may be advantageously used for removing impurities, such as arsenic, which form acid oxides.

For example, the iron oxide and silica combine to form iron silicate, and the free iron oxide in the slag is thereby decreased and the slag given high capacity to extract further iron oxide from the copper. Similarly, arsenic oxide combines with calcium oxide to form calcium arsenate, and the free arsenic oxide in the slag is thereby decreased, and the slag given high capacity to absorb further arsenic from the copper.

It will be understood that the above examples are illustrative only and that various other specific compositions of slags may be formed suitable for removing the metal and metalloid impurities in the refining operation. Also, the copper may be advantageously subjected to two or more refining treatments, one with an acid slag for removing the impurities which form basic oxides, and the other with a basic slag for removing the impurities which form acid oxides.

For deoxidizing copper, a slag should be employed which has a high capacity for extracting the dissolved copper oxide from the molten copper. Slags for this purpose may contain silica, titania, alumina, lime, magnesia, alkali-metal or alkaline-earth metal salts, oxides of iron, or other metals which are not readily reducible by the copper.

Acid slags of this character have a high capacity for extracting copper oxide from the molten copper. The usual acid slags, and particularly the acid slags of the character employed in steel refining, which are silicious slags, are not molten or are viscous and not fluid at the temperatures employed in copper refining. For that reason there is presented the problem of forming an acid slag which will have a low fluidification temperature. For this purpose I have found that titanium dioxide is particularly useful, as it gives great fluidity to the slag without impairing its acid character.

While the deoxidizing slag containing the titanium dioxide as a fluidifying agent is particularly adapted for use in my process of intimately intermixing slag and copper as hereinbefore specifically described, acid deoxidizing slags rendered fluid by the addition of titanium dioxide may be used in other processes for deoxidizing copper.

As typical examples of acid deoxidizing slags, I may cite the following:

*Example No. 5*

|  | Per cent |
|---|---|
| TiO$_2$ | 65 |
| SiO$_2$ | 20 |
| MnO | 15 |

This is a low melting point slag.

*Example No. 6*

An acid slag of somewhat higher melting point may have the following composition:

|  | Per cent |
|---|---|
| TiO$_2$ | 5 |
| SiO$_2$ | 55 |
| CaO | 15 |
| Al$_2$O$_3$ | 15 |
| MnO | 10 |

During the violent intermixing the slag becomes enriched with Cu$_2$O. The removal of the oxide from copper is greater the greater the quantity of the slag which is intermixed with the metal. With a sufficiently large quantity of slag it is possible to leave in the copper only traces of the dissolved oxide. If it is desired to effect a very complete deoxidation, successive slags may be employed. The exhausted slag from one operation is, of course, removed before the metal is treated with the fresh slag.

My deoxidizing operation is accompanied by a removal of residual metal and metalloid impurities which may be in the copper. If M is a metal or metalloid impurity contained in the copper, which contains also in solution oxide of copper, Cu$_2$O, it will be found that from the reaction the following equilibrium will result:

$$M_pO_q + 2qCu \rightleftharpoons qCu_2O + qM$$

whereby a portion of M is dissolved in the copper as M$_p$O$_q$. By causing the slag to react with the metal as in my process, if this slag is poor in M$_p$O$_q$, it will dissolve from the copper a portion of the M$_p$O$_q$, with the result that the copper will be purified of the metal or metalloid impurity M. For example, if the slag contains little, if any, iron oxide, it will eliminate a portion of the iron dissolved in the copper in the form of oxide of iron. It will be understood that this purification effect is itself increased by increase in the ratio of the quantity of slag used, or by the successive actions of several slags.

After the slags have become charged with oxide of copper and thus exhausted as deoxidizing slags, the slags may be regenerated by the reduction of copper oxide, as with carbon, and re-used.

I have found that the deoxidizing may be facilitated with deoxidizing auxiliaries, such as manganese or phosphorus, added to the molten copper before the deoxidizing operation. If a small amount of manganese is added and the deoxidizing carried out with an acid slag, the deoxidation of the copper is facilitated by the action of of the manganese. Manganese is readily oxidized and reduces some of the copper oxide, forming manganese oxide which is apparently not so readily soluble in the copper as is copper oxide, and which is therefore readily transferred into the slag where it becomes fixed by combination with the acid constituents of the slag. Small amounts of magnesium, iron, zinc and lead may be similarly used.

When suitable deoxidizing auxiliaries, such as phosphorus or silicon, are employed, the deoxidation may be carried out with basic slags. These metalloids are readily reduced and reduce some of the copper oxide in the copper, forming phosphorus or silicon oxides which are apparently not so readily soluble in the copper as is copper oxide, and which are therefore readily transferred into the slag where they combine with the basic constituents of the slag.

As examples of basic slags which may be employed for deoxidizing, with the addition to the copper of an auxiliary agent such as phosphorus or silicon, I may cite—

*Example No. 7*

|  | Per cent |
|---|---|
| Na$_2$O | 25 |
| CaO | 45 |
| MnO | 15 |
| FeO | 10 |
| MgO and Al$_2$O$_3$ | 5 |

*Example No. 8*

A somewhat higher melting point slag may have the following composition:

|  | Per cent |
|---|---|
| CaO | 60 |
| MnO | 25 |
| FeO | 10 |
| MgO and Al$_2$O$_3$ | 5 |

The deoxidizing auxiliary agents are of the class of metals and metalloids which are capable of reducing copper oxide, and whose oxidation products combine with the acid or basic constituents of the slag.

Only a small amount, usually about 1% or less, of the deoxidizing auxiliary is added, depending upon the oxide content of the copper, and tests have shown that little, if any, of the deoxidizing auxiliary remains in the finished metal.

The deoxidizing effected by my process is quite complete. For example, 3000 kilograms of copper containing .18% oxygen was treated with 300 kilograms of slag in accordance with my process and the oxygen content reduced to .04%.

Another copper containing .30% total oxygen was similarly treated, but with the addition of 1% manganese before the deoxidizing operation, and the oxygen content reduced to .01%.

The amount of slag for refining or deoxidizing depends upon the amount of impurities to be removed or upon the state of oxidation of the copper. Usually, the slag is about 5 to 15% by weight of the copper being treated.

The refining of the crude copper of its metal and metalloid impurities in accordance with my process may be carried out singly or in combination with the deoxidizing process. Similarly, my deoxidizing process can be carried out independently of or in combination with my refining process. When the two processes are combined, the copper is first refined of its metal and metalloid impurities by the oxidizing refining operation, and the thus refined copper is thereafter deoxidized by the deoxidizing operation.

While I have described my process with particular reference to the purification of copper, it may be employed for the purification of copper alloyed with other substances, and therefore where the expression "copper" without other limitations is employed in the claims, it is intended to include copper alone or copper alloyed with other metals, such, for example, as the bronzes and brasses.

The present application is a continuation in part of my copending applications Serial Nos. 666,758 and 666,759, both filed April 18, 1933.

The claims in this application are directed specifically to the purifying of copper. Claims directed to the generic aspects of my process of treating metals with slags are presented in my copending application Serial No. 695,194, filed October 25, 1933.

While I have specifically described the preferred procedure of carrying out my invention, it is to be understood that the invention is not so limited, but may be otherwise embodied and practiced within the scope of the following claims.

I claim:

1. The process of purifying copper, which comprises causing an impact of a body of the molten copper to be purified with a body of fluid molten purifying slag with such violence as to cause one to be dispersed into the other in a finely divided condition and form a turbulent mass of intimately intermixed slag and metal in order to bring about a speedy and intimate admixture of slag and metal and thereby quickly effect the desired reaction between the slag and metal, and allowing the metal to separate from the slag.

2. The process of purifying copper, which comprises causing a body of the molten copper to be purified to fall against a body of fluid molten purifying slag from a height sufficient to cause an impact violent enough to secure immediate and intimate admixture of the metal and slag and thereby quickly bring about the desired reaction between them, and allowing the metal to separate from the slag.

3. The process of purifying copper, which comprises forming a turbulent mass of molten copper to be purified and a fluid molten purifying slag intermixed in a finely divided condition and thereby quickly effect the purifying reaction between the slag and metal, and allowing the metal to separate from the slag.

4. The process of purifying copper, which comprises forming a turbulent mass of molten copper to be refined and a fluid molten slag intermixed in a finely divided condition so as to bring about an immediate high-speed reaction between the metal and slag, the metal and slag being brought to such a temperature and the reaction taking place with such rapidity as not to require the application of additional heat.

5. The process of purifying copper, which comprises energetically mixing the molten copper to be purified with a previously molten fluid slag of such character that it will extract from the copper the greater part of the impurities to be removed, the intermixing being effected by bringing together the molten copper and molten slag with such violent intensity as to cause a speedy and intimate mixture in the nature of an emulsion of the molten slag and molten metal, and allowing the slag to separate from the metal.

6. The refining process of separating from copper contained metal or metalloid impurities, which comprises causing an impact of a body of the molten copper to be refined with a body of fluid molten slag adapted to extract the impurities with such violence as to cause one to be dispersed into the other in a finely divided condition and form a turbulent mass of intimately intermixed slag and metal in order to bring about a speedy and intimate admixture of slag and metal and thereby quickly effect the desired removal of the impurities from the metal, and allowing the metal to separate from the slag.

7. The refining process of separating from copper contained metal or metalloid impurities, which comprises forming a turbulent mass of the molten copper to be refined and a fluid molten refining slag intermixed in a finely divided condition and thereby quickly effecting the desired reaction between the slag and metal, and allowing the metal to separate from the slag.

8. The refining process of separating from copper contained metal or metalloid impurities, which comprises energetically intermixing the copper to be refined with a previously molten fluid refining slag, said intermixing being effected by bringing together the copper and the slag with such violent intensity as to cause a speedy and intimate mixture in the nature of an emulsion of the slag and the metal, and allowing the metal to separate from the slag.

9. The process of deoxidizing copper, which comprises causing an impact of a body of the molten copper to be deoxidized with a body of fluid molten deoxidizing slag with such violence as to cause one to be dispersed into the other in a finely divided condition and form a turbulent mass of intimately intermixed slag and metal in order to bring about a speedy and intimate admixture of slag and metal and thereby quickly effect the deoxidation of the copper, and allowing the metal to separate from the slag.

10. The process of deoxidizing copper, which comprises forming a turbulent mass of molten copper to be deoxidized and a fluid molten deoxidizing slag intermixed in a finely divided condition and thereby quickly effecting the deoxidation of the copper, and allowing the metal to separate from the slag.

11. The process of deoxidizing copper, which comprises energetically intermixing molten copper to be deoxidized with a previously molten deoxidizing slag, the intermixing being effected by bringing together the molten copper and molten slag with such violent intensity as to cause a speedy and intimate mixture in the nature of an emulsion of the slag and metal, and allowing the metal to separate from the slag.

12. The process of refining and deoxidizing copper, which comprises forming a turbulent mass of molten copper containing metal or metalloid impurities to be removed and a fluid molten refining slag intermixed in a finely divided condition and thereby quickly effecting the refining of the copper, allowing the metal to separate from the slag, thereafter forming a turbulent mass of the thus refined copper and a fluid molten deoxidizing slag intermixed in a finely divided condition thereby quickly effecting the deoxidation of the copper, and allowing the metal to separate from the slag.

13. The process of refining and deoxidizing copper, which comprises forming a molten bath of the copper to be refined, forming a fluid molten oxidizing refining slag, intimately intermixing the molten copper and molten slag with sufficient violence to bring about a quick refining of the copper, allowing the copper to separate from the slag, forming a fluid molten deoxidizing slag, intimately intermixing the refined copper in a molten condition with the molten slag with sufficient violence to bring about a quick deoxidation of the copper, and allowing the copper to separate from the slag.

14. The process of deoxidizing copper, which comprises forming a molten bath of the copper to be deoxidized, adding to the copper as an auxiliary deoxidizing agent a metal or metalloid which will reduce copper oxide, forming a fluid molten deoxidizing slag containing a constituent which will combine with the oxidation products of the auxiliary agent, intimately intermixing the molten copper and molten slag with sufficient violence to bring about a quick deoxidation of the copper, and allowing the copper to separate from the slag.

15. The process of deoxidizing copper, which comprises forming a molten bath of the copper to be deoxidized, adding to the copper as an auxiliary deoxidizing agent a metal or metalloid which reduces copper oxide, and thereafter deoxidizing the copper by means of a fluid molten deoxidizing slag containing a constituent which will combine with the oxidation products of the auxiliary agent.

16. The process of deoxidizing copper, which comprises forming a molten bath of the copper to be deoxidized, adding to the copper an auxiliary deoxidizing agent which reduces copper oxide, forming a fluid molten slag containing a constituent which combines with the oxidation products of the auxiliary agent, forming a turbulent mass of the molten copper and molten slag intermixed in a finely divided condition and thereby quickly effecting the deoxidation of the copper, and allowing the metal to separate from the slag.

17. The process of deoxidizing copper, which comprises forming a turbulent mass of the molten copper to be deoxidized and a molten slag containing titanium dioxide as a fluidifying agent intermixed in a finely divided condition and thereby quickly effecting the deoxidation of the copper, and allowing the copper to separate from the slag.

18. The process of deoxidizing copper, which comprises forming a molten bath of the copper to be deoxidized, forming a molten deoxidizing slag containing titanium dioxide as a fluidifying agent, quickly intermixing the molten copper and molten slag with sufficient intimacy to bring about a quick deoxidation of the copper, and allowing the copper to separate from the slag.

19. The process of deoxidizing copper, which comprises forming a molten bath of the copper to be deoxidized, forming a fluid molten slag containing titanium dioxide as a fluidifying agent, and deoxidizing the copper by means of such slag.

20. Process of refining crude copper as specified in claim 6, wherein the refining slag contains approximately 40% $SiO_2$, 20% $TiO_2$, 20% $Cu_2O$, 15% MnO and 5% $Na_2O$.

21. Process of deoxidizing refined copper as specified in claim 11, wherein the deoxidizing slag contains approximately 65% $TiO_2$, 20% $SiO_2$ and 15% MnO.

22. Process of refining and deoxidizing copper as specified in claim 13, wherein the refining slag contains approximately 40% $SiO_2$, 20% $TiO_2$, 20% $Cu_2O$, 15% MnO, and 5% $Na_2O$, and the deoxidizing slag contains approximately 65% $TiO_2$, 20% $SiO_2$ and 15% MnO.

RENÉ PERRIN.